US008131901B2

(12) United States Patent
Mansell et al.

(10) Patent No.: US 8,131,901 B2
(45) Date of Patent: Mar. 6, 2012

(54) INTERRUPT CONTROL FOR VIRTUAL PROCESSING APPARATUS

(75) Inventors: David H Mansell, Cambridge (GB); Richard R Grisenthwaite, Cambridgeshire (GB)

(73) Assignee: ARM Limited, Cambridge (GB)

(*) Notice: Subject to any disclaimer, the term of this patent is extended or adjusted under 35 U.S.C. 154(b) by 253 days.

(21) Appl. No.: 12/457,263

(22) Filed: Jun. 4, 2009

(65) Prior Publication Data

US 2010/0023666 A1 Jan. 28, 2010

(30) Foreign Application Priority Data

Jul. 28, 2008 (GB) .................................. 0813794.5

(51) Int. Cl.
*G06F 13/24* (2006.01)
(52) U.S. Cl. ...................... 710/260; 710/266; 710/268
(58) Field of Classification Search .................... 710/267
See application file for complete search history.

(56) References Cited

U.S. PATENT DOCUMENTS

| 5,361,375 | A | 11/1994 | Ogi |  |
|---|---|---|---|---|
| 5,506,975 | A | 4/1996 | Onodera |  |
| 7,000,051 | B2* | 2/2006 | Armstrong et al. | 710/267 |
| 7,209,994 | B1 | 4/2007 | Klaiber et al. |  |
| 7,237,051 | B2* | 6/2007 | Bennett et al. | 710/260 |
| 7,533,207 | B2* | 5/2009 | Traut et al. | 710/260 |
| 7,543,095 | B2* | 6/2009 | Belmar et al. | 710/260 |
| 7,590,982 | B1* | 9/2009 | Weissman | 718/1 |
| 7,689,747 | B2* | 3/2010 | Vega et al. | 710/261 |
| 7,707,341 | B1* | 4/2010 | Klaiber et al. | 710/244 |
| 7,730,249 | B2* | 6/2010 | Yoshii et al. | 710/267 |
| 2004/0205272 | A1 | 10/2004 | Armstrong et al. |  |
| 2004/0215860 | A1 | 10/2004 | Armstrong et al. |  |
| 2006/0218328 | A1* | 9/2006 | Vega et al. | 710/260 |
| 2008/0155153 | A1* | 6/2008 | Yoshii et al. | 710/262 |
| 2008/0235425 | A1* | 9/2008 | Belmar et al. | 710/260 |
| 2009/0300250 | A1* | 12/2009 | Weissman | 710/260 |
| 2010/0023666 | A1* | 1/2010 | Mansell et al. | 710/267 |

FOREIGN PATENT DOCUMENTS

EP 0 301 275 2/1989

OTHER PUBLICATIONS

UK Search Report dated Nov. 27, 2008 for GB 0813794.5.
International Search Report and Written Opinion dated Oct. 1, 2009 for PCT/GB2009/001398.

* cited by examiner

*Primary Examiner* — Ryan Stiglic
(74) *Attorney, Agent, or Firm* — Nixon & Vanderhye P.C.

(57) ABSTRACT

A data processing system supporting one or more virtual processing apparatuses is provided with external interrupt interface hardware 26 and virtual interface hardware 28. Hypervisor software responds to an interrupt received by the external interrupt interface hardware 26 to write data characterising that interrupt into list registers 18 of the virtual interface hardware 28. A guest operating system for the virtual machine of the virtual data processing apparatus being emulated may then read data from the virtual interface hardware 28 characterising the interrupt to be processed by that virtual machine. The virtual machine and the guest operating system interact with the virtual interface hardware 28 as if it were external interface hardware. The hypervisor software is responsible for maintaining the data within the virtual interface hardware 28 to properly reflect queued interrupts as received by the external interface 26.

58 Claims, 9 Drawing Sheets

| physical int# | VM# | VM int# |
|---|---|---|
| 1 | 1 | 1 |
| 2 | 1 | 2 |
| 3 | 2 | 1 |
| 4 | 2 | 2 |
| 5 | 1 | 7 |
| 6 | 3 | 1 |

INTERRUPT CONTROL FOR VIRTUAL PROCESSING APPARATUS

BACKGROUND OF THE INVENTION

1. Field of the Invention

This invention relates to data processing systems. More particularly, this invention relates to the handling of interrupts within data processing systems using one or more virtual processing apparatuses.

2. Description of the Prior Art

It is known to provide data processing systems with virtualisation support for one or more virtual processing apparatuses. One example of such systems is where a particular processor is physically implemented and it is desired to provide support for multiple virtual machines. In these circumstances the physical processor can execute is software (e.g. hypervisor software) to provide support for the multiple virtual machines, e.g. switching between which virtual machine is executing.

One particular problem within systems providing such virtualisation support is how interrupts are handled. Interrupt processing speed is often a critical performance parameter of a data processing system, particularly in the field of real time processing. One approach is to provide a software-based virtual interrupt controller in the hypervisor code for each virtual processing system supported. An attempt by the virtual processing system to access the interrupt controller causes an entry to the hypervisor which can then simulate the correct response. If accesses to the interrupt controller are frequent, then this can be disadvantageously slow. The processing of each interrupt typically involves a minimum of two interrupt controller accesses and often more. Furthermore, some virtual processing systems make frequent accesses to the interrupt controller to change the active priority level for the processor. Accordingly, this software-based virtual interrupt controller technique providing the required functionality has a noticeable negative impact on overall performance.

It is also possible to build a hardware based mechanism which supports multiple virtual machines natively and maps each virtual machine's interrupt controller accesses to the appropriate action in hardware. However, this hardware approach can involve a disadvantageously large hardware overhead and can also impose potentially limiting restrictions in terms of how many interrupts and/or virtual machines can be supported.

A further approach is the use of paravirtualisation to reduce the overhead of interrupts by using more efficient hypercalls. Even with these approaches there will be at least one hypervisor entry when a physical interrupt arrives and another when the interrupt processing is completed (to enable the physical interrupt to be re-enabled).

SUMMARY OF THE INVENTION

Viewed from one aspect, this invention provides a method of processing interrupt signals using an apparatus for processing data providing virtualisation support for one or more virtual processing apparatuses, said method comprising the steps of:

in response to an interrupt signal received by said apparatus for processing data, writing data characterising said interrupt signal to at least one of one or more virtual interfaces to respective virtual processing apparatuses, said one or more virtual interfaces being provided in hardware and respectively including one or more list registers storing a list of uncompleted interrupts for an associated virtual processing apparatus;

in response to said list of uncompleted interrupts within said list registers of said at least one virtual interface, generating a virtual interrupt signal to trigger interrupt processing corresponding to interrupt processing by said associated virtual processing apparatus and providing data characterising said virtual interrupt signal for reading from one or more interface registers included within said at least one virtual interface;

in response to said virtual interrupt signal, using a first control program executing as though upon said associated virtual processing apparatus to read said data characterising said interrupt signal from said one or more interface registers; and in response to said data characterising said interrupt signal read from said one or more interface registers, performing interrupt processing under control of said first control program and corresponding to interrupt processing by said associated virtual processing apparatus.

This technique provides a hardware based (hence fast) support for the common operations involved in interrupt processing without incurring the high overhead costs and limitations of a full hardware based approach as discussed above. Furthermore, it offers higher performance than the pure software-based approach in which every access to the interrupt controller is trapped.

The present technique provides a virtual interface in hardware that includes one or more list registers storing a list of uncompleted interrupts for an associated virtual processing apparatus together with one or more interface registers for providing data characterising a virtual interrupt signal generated by this hardware. A first control program (such as, for example, a guest operating system) executing as though upon the virtual processing apparatus associated with the current list of uncompleted interrupts responds to the virtual interrupt signal to read data characterising the interrupt signal from the interface registers and then perform processing corresponding to interrupt processing by the associated virtual processing apparatus. This arrangement offers higher performance than trapping every access to the interrupt controller, as the one or more virtual interfaces are provided in hardware, and yet does not incur the high hardware costs and limitations of a full hardware model. The hardware of the virtual interfaces may be shared between associated virtual processing apparatuses such that when the virtual machine is switched, the state within the virtual interface is also switched. In practice this is not a significant disadvantage since when the virtual machine is switched a larger number of registers need to be swapped and a considerable amount of time is already consumed with such virtual machine switching operations.

The writing of the data characterising the interrupt signal to the virtual interfaces may be performed using a second control program executed by the apparatus, such as, for example, a hypervisor control program.

The first control program can write data indicative of completion of the processing corresponding to the interrupt processing by the associated virtual processing apparatus by writing data to the one or more interface registers under control of the first control program. This can provide a mechanism for signalling an end-of-interrupt event.

The data indicative of the completion of interrupt processing can be read from the one or more interface registers using the second control program to note that the interrupt processing by the associated virtual processing apparatus has completed. This can be useful in signalling such completion to other levels within the system, such as a physical apparatus which generated the original interrupt and is waiting for notification of completion of that interrupt.

As mentioned above, a plurality of virtual processing apparatuses may share a virtual interface provided in hardware and in this context the second control program can control which virtual processing apparatus is currently using the virtual interface. If the second control program is a hypervisor, then this will typically already be managing which virtual machine is active and accordingly, when virtual machines are switched, the use of the virtual interface may also be switched.

The apparatus for processing data may be a multiprocessing apparatus (i.e. an apparatus including multiple processor cores) and each of these processors may have a virtual interface provided in hardware and controlled in dependence upon which virtual processing apparatus is being supported by the corresponding processor.

The second control program can maintain data characterising uncompleted interrupts in respect of each of the one or more virtual processing apparatuses including managing the contents of the list registers and any overflow from those list registers.

The uncompleted interrupts stored within the list registers can represent one or more of a pending interrupt that has arisen but has not yet been notified to the first control program and one or more active interrupts which have been notified to the first control program and are still subject to interrupt processing by the first control program.

The data processing apparatus may use an external interrupt controller provided in hardware and having one or more external interface registers to manage receipt of physical interrupt signals from outside of the processing apparatus.

Reading data characterising an interrupt signal from the external interface registers can serve to acknowledge receipt of that interrupt signal to outside systems. The external interrupt controller can process interrupt signals received at a plurality of interrupt signal inputs without prioritisation or may be switched, using a configuration flag, to process with prioritisation depending upon the underlying state of the data processing apparatus (e.g. whether a virtual processing apparatus is currently being emulated).

The physical interrupts received by the apparatus for processing data can have an interrupt number associated with them and the virtual interrupt signal generated by the virtual interface provided in hardware can have a virtual interrupt number associated therewith. The second control program can perform the mapping between the physical interrupt number and the virtual interrupt number.

The second control program can select which of a plurality of virtual processing apparatus is to serve to perform the interrupt processing when a multiprocessor system is being used. It may be that multiple virtual processing apparatus are capable of dealing with a particular interrupt and the second control program can allocate an interrupt to an appropriate one of these candidate virtual processing apparatuses in a manner seeking to improve overall operational efficiency. The second control program may also respond to software generated interrupt signals in place of physical interrupt signals received by the apparatus for processing data. Such software generated interrupt signals may be generated by the second control program itself. These software generated interrupt signals can also be generated by, for example, one of the virtual processing apparatuses.

It will be appreciated that the list registers represent a finite resource for storing data characterising uncompleted interrupts. In order to address this issue, the second control program can buffer data characterising uncompleted interrupts if the one or more list registers overflow. The second control program can also serve to refill the one or more list registers with data characterising uncompleted interrupts and buffered by the second control program as free space within the one or more list registers becomes available.

The refilling of the list registers can be triggered by generation of a refill interrupt by the hardware providing the virtual interface with the second control program then filling the empty space with buffered uncompleted interrupt.

Generation of the refill interrupt may be gated by an overflow flag such that if the second control program is not buffering any data characterising uncompleted interrupts, then empty space within the list registers need not be immediately refilled when it becomes available due to completion of other interrupts.

The virtual interface may include a priority register storing data indicative of priority levels associated with any interrupt processing currently being performed as though upon the associated virtual data processing apparatus. Tracking the priority level(s) in this way with a priority register allows appropriate control decisions to be made regarding whether or not a newly arising interrupt should pre-empt existing interrupt processing, as well as other control measures.

The generation of the virtual interrupt signal and the writing of the data characterising the virtual interrupt signal can be performed under hardware control by the virtual interface.

The one or more list registers can store a variety of different forms of data such as data characterising a physical interrupt number; a virtual interrupt number; a requesting processing apparatus within a multiprocessing apparatus in respect of software interrupts; a priority value; a valid flag and a flag differentiating a type of interrupt signal received by said apparatus for processing data.

The list registers can store data indicative of whether a corresponding uncompleted interrupt is a pending interrupt or an acting interrupt, e.g. a pending/active flag.

The one or more interface registers can store data indicative of a physical interrupt number and/or a requesting processing apparatus within a multiprocessing apparatus in respect of software interrupt.

One or more control registers can be associated with the virtual interface and store data indicative of a variety of different information including: a list of active priorities associated with nested interrupts; a count of instances of interrupt processing being completed without a corresponding update in data tracking said interrupt processing; a flag indicative of uncompleted interrupts being buffered; a priority mask value; and priority binary point value, and a flag enabling the virtual interface.

When a virtual interrupt signal is generated it can have an associated priority value and the step of generating a virtual interrupt signal may be dependent upon a comparison of the associated priority value and a priority value stored within a priority register such that interrupt processing currently being performed will not be interrupted as a consequence of lower priority interrupt signal received by the apparatus for processing data.

Such priority control may be dependent upon one or more of a priority mask value (indicative of priority levels associated with currently active interrupt processing); and a priority binary point value (indicative of an amount a new interrupt should exceed a currently active interrupt being processed in order to pre-empt that currently active interrupt).

When an interrupt being processed under control of the first control program is completed, mapping from the virtual interrupt number back to the physical interrupt number can be performed, triggering signalling of the completion to a source of the interrupt signal using the physical interrupt number so derived.

Viewed from another aspect the present invention provides apparatus for processing data providing virtualisation support for one or more virtual processing apparatuses, said apparatus comprising:

external interrupt interface circuitry responsive to an interrupt signal received by said apparatus for processing data to write data characterising said interrupt signal to one or more external interface registers so as to communicate with a second control program; and virtual interrupt interface circuitry providing a virtual interface to respective virtual processing apparatuses, said virtual interface including one or more list registers storing a list of uncompleted interrupts for an associated virtual processing apparatus, said one or list registers being at least writable by said second control program; wherein in response to said list of uncompleted interrupts within said list registers, said virtual interrupt interface circuitry serves to:

generate a virtual interrupt signal to trigger interrupt processing corresponding to interrupt processing by said associated virtual processing apparatus and under control of a first control program; and write data characterising said virtual interrupt signal to one or more virtual interface registers included within said virtual interrupt interface circuitry for said virtual interface.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
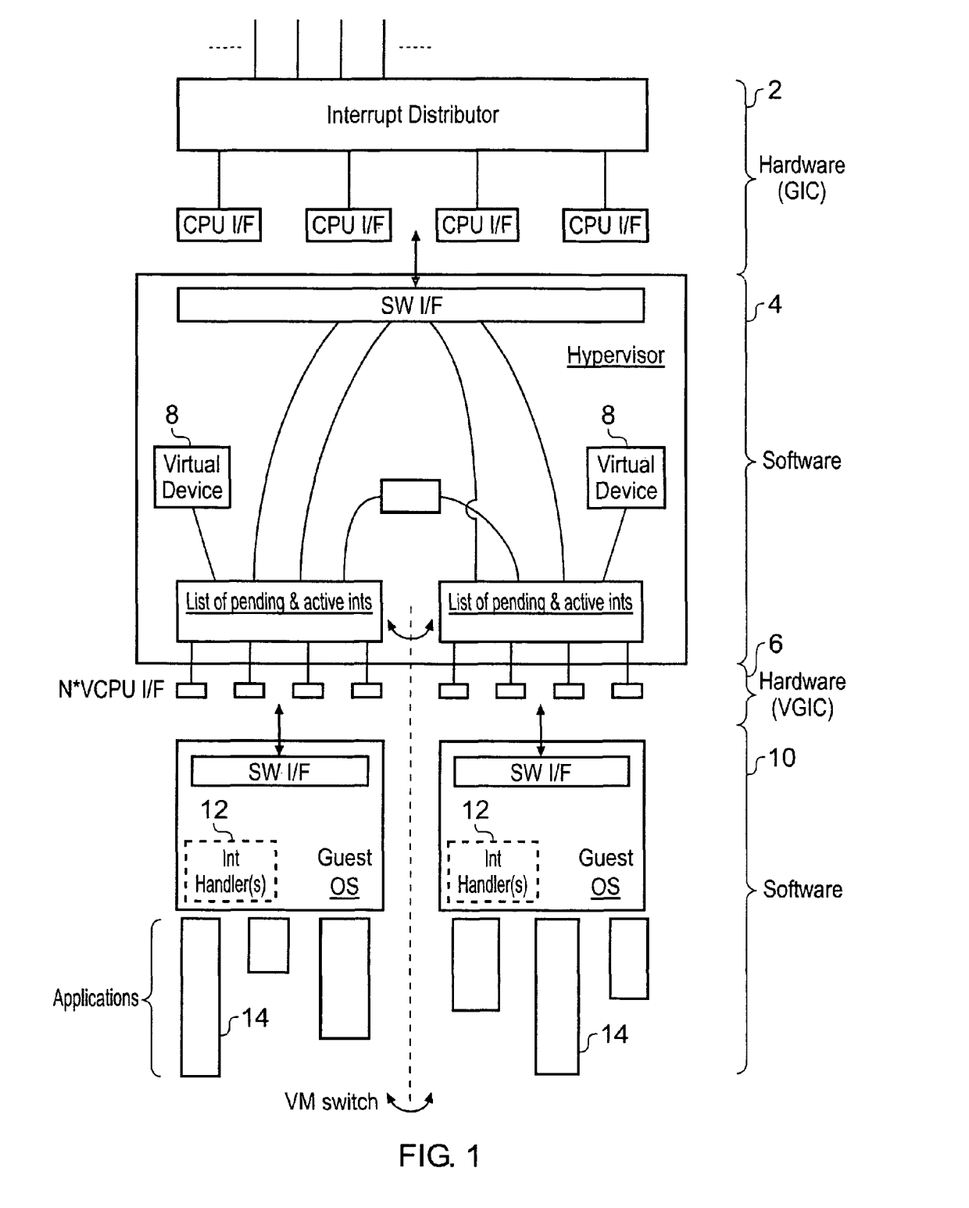
FIG. 1 schematically illustrates hardware and software elements associated with interrupt processing within a system supporting virtual data processing apparatuses.

FIG. 1 illustrates various portions of hardware and software involved in interrupt processing within a system supporting virtual data processing apparatuses. These elements include an external interrupt interface 2, which may have the form of a general interrupt controller (GIC) of the type provided by ARM Limited of Cambridge, England. Responsive to the external interrupt interface 2 is hypervisor software 4 (second control program) which exchanges signals with the external interrupt interface 2 as well as a virtual interface 6 which is also provided in hardware. The hypervisor software 4 is responsible for the allocation of physical interrupts to virtual processing apparatuses as well as the generation of software interrupts by one or more virtual devices 8. The hypervisor software 4 controls which virtual processing apparatus or virtual processing apparatuses are currently active and any context switching between such virtual processing apparatuses that may be required.

It will be appreciated that the underlying hardware may be a single processor or may be a multiprocessing apparatus, such as in a multiprocessor including a plurality of processor cores. The hypervisor software 4 in multiprocessing embodiments is responsible for allocating a particular interrupt to a particular virtual processing apparatus where there is more than one candidate for processing the interrupt concerned.

At a level beneath the virtual interface 6 (VGIC) there is provided guest operating system software 10 (first control program) which reads data characterising interrupts from the virtual interface 6 as well as writing data to that virtual interface (such as end-of-interrupt signals) as part of the management/handling of the interrupts. The guest operating systems 10 include interrupt handling software 12 for processing the interrupt signals received. Application programs 14 and the interrupt handling software 12 execute upon the guest operating systems 10 as if they were executing upon the associated virtual processing apparatus. Thus, application software 14 and interrupt handlers 12 that have been written for one specific processor (or instance/use of that processor) can be reused within the system of FIG. 1 without requiring significant modification since the virtual interface 6 and the hypervisor 4 together provide an environment emulating the specific processor for which they were written together with the surrounding interrupt mechanisms.

In the example illustrated in FIG. 1 a single processor core is being used and the two instances of guest operating systems 10 are shown as being switched upon a context switch. When such a virtual machine switch takes place, the hypervisor 4 which is controlling this switch also switches the data characterising interrupts stored within the virtual interface 4 (including any buffered data stored within software by the hypervisor) so that the data within the virtual interface is current for the current virtual machine being supported.

Figure 2:
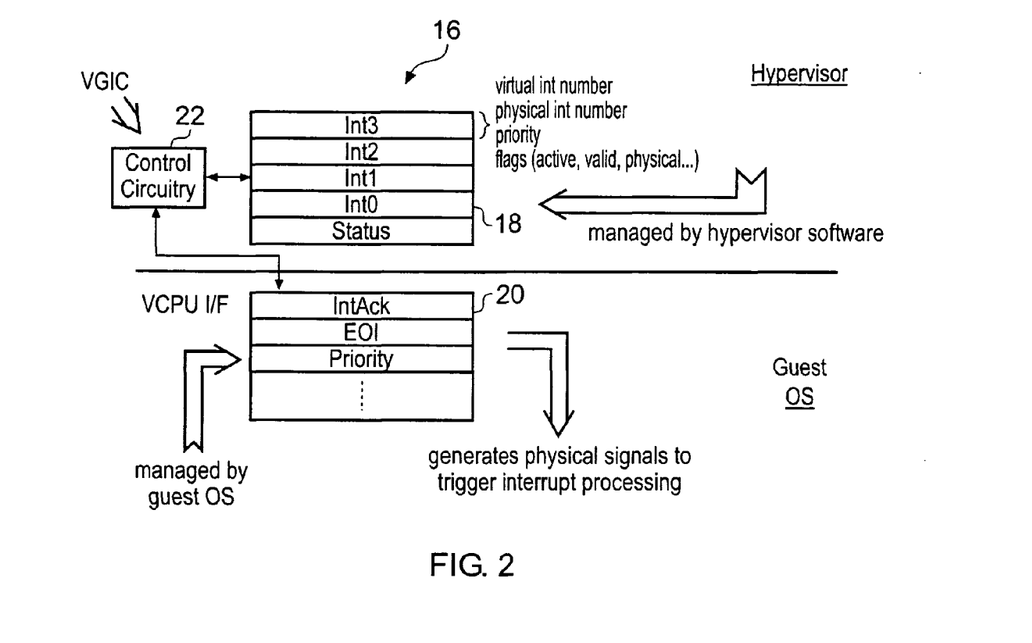
FIG. 2 schematically illustrates a virtual interface.

FIG. 2 schematically illustrates the virtual interface hardware 16. The virtual interface hardware 16 includes list registers 18 storing a list of uncompleted interrupts for an associated virtual machine currently in use. The data stored within the list register for each uncompleted interrupt includes a physical interrupt number, a virtual interrupt number, a requesting processing apparatus within a multiprocessing apparatus in respect of software interrupts, a priority value, a valid flag, a flag differentiating different types of interrupt (physical/software) as well as other data, such as an empty flag indicating that the particular entry within the list registers 18 is empty. Also provided within the virtual interface hardware 16 are interface registers 20 providing data characterising an interrupt being passed to the underlying virtual machine for processing by that underlying virtual machine. This data can include a register to which an access is made to acknowledge an interrupt, signal an end-of-interrupt, signal a priority level etc. The interface registers 20 provided in this virtual interface hardware 16 are configured in the same way as those of the external interface hardware 2. The virtual machine executing the guest operating system can interact with the interface registers 20 in the same way as if those interface registers were part of external interface hardware.

The list registers 18 are managed by the hypervisor 4. The interface registers 20 are managed by the guest operating system. Furthermore, control circuitry 22 coupled to both the list registers 18 and the interface registers 20 serves to control the interaction of these hardware mechanisms as will be described further below. It will be appreciated by those in this technical field that the control circuitry 22 can take a wide variety of different physical forms in order to achieve the behaviour illustrated in connection with FIGS. 6, 7 and 9.

Figure 3:
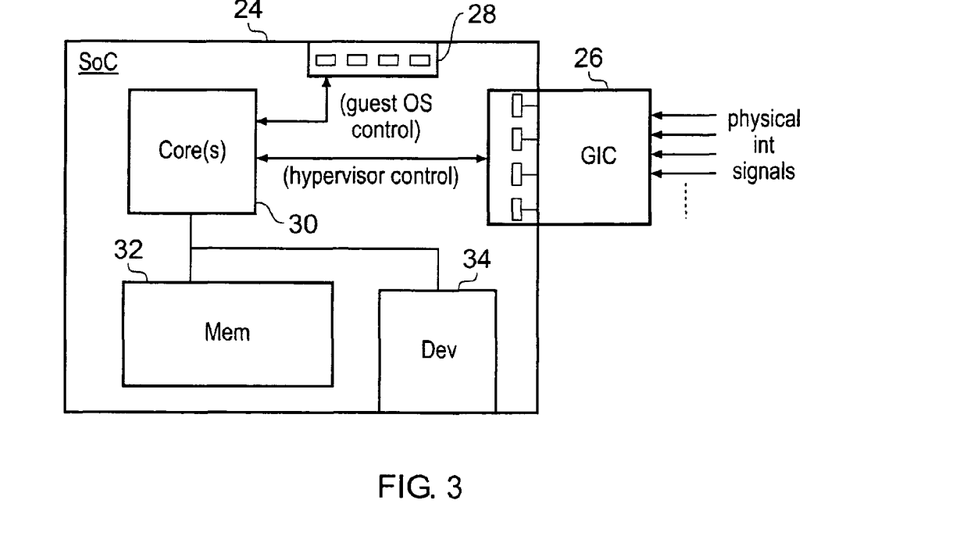
FIG. 3 schematically illustrates an apparatus for data processing including an external interrupt interface and a virtual interface.

FIG. 3 illustrates an integrated circuit 24 including external interface hardware 26 in the form of a general interrupt controller responsive to a plurality of physical interrupt signals. Virtual interface hardware 28 is provided within the integrated circuit 2 for use in conjunction with guest operating systems executing as if upon virtual machines emulated by the integrated circuit 4. Also included within the integrated circuit are one or more processor cores 30 and a memory 32 for storing software (such as hypervisor software, guest operating system software, interrupt handler code, application code, and the like). A physical device such as a video controller 34 may also be present to provide other functionality to the integrated circuit 24. As shown, the external interface hardware 26 is controlled by the hypervisor software and the virtual interface hardware 28 is controlled by the guest operating system. Both the hypervisor software and the guest operating system execute on the one or more processor cores 30. If multiple processor cores 30 are provided, then each of these may be provided with its own virtual interface hardware 28. Such multiple instances of virtual interface hardware 28 can be collectively managed by the hypervisor software, which is also controlling the execution of the multiple processor cores in such an embodiment.

Figure 4:
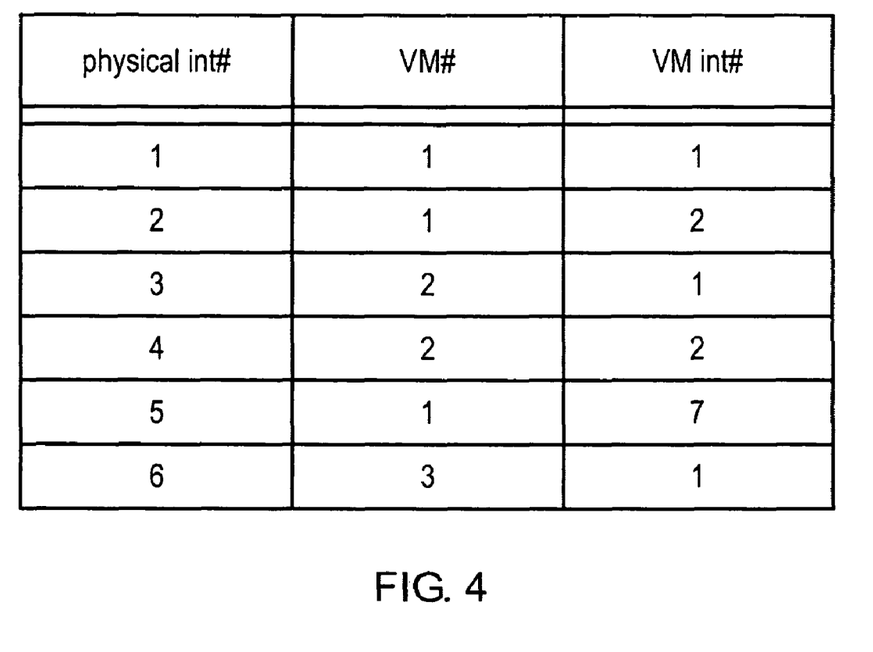
FIG. 4 illustrates a mapping between physical interrupt numbers and virtual interrupt numbers.

FIG. 4 illustrates a table giving a mapping between physical interrupt numbers as received by the external interface hardware 26, virtual machine instances as may be selected to operate by the hypervisor software and virtual interrupt numbers as may be used by those virtual machines. As illustrated, each of the physical interrupt numbers is distinct. A given virtual machine can have multiple virtual interrupt numbers used, e.g. virtual machine #1 uses virtual interrupt numbers #1, #2 and #7. A given virtual machine may reuse virtual interrupt numbers which are also used by a different virtual machine, e.g. virtual machine #2 has its own virtual interrupt numbers #1 and #2 and these would typically be independent of the similarly numbered virtual interrupts for virtual machine #1. The mapping data illustrated in FIG. 4 is managed and used by the hypervisor software to populate the list registers 18 with data characterising physical interrupt signals received by the external interface hardware 26 and requiring servicing by one of the virtual machines. This data can also be used to perform an appropriate reverse-mapping when an interrupt completes processing by one of the virtual machines and it is desired to notify such completion to the external hardware via the external interface hardware 26.

The external interface hardware 26 can be configured by an appropriate flag to not prioritise the interrupts it physically receives and leave prioritisation to the underlying hypervisor software. Alternatively, the external interface hardware 26 could provide some measure of prioritisation in accordance with known interrupt controller techniques if this is desired. In some embodiments, when the external interface hardware 26 is read by the hypervisor software to determine details of a physical interrupt that has been received, this is treated as an interrupt acknowledge signal by the external interface hardware 26. An end-of-interrupt signal can subsequently be passed out for the interrupt concerned once the virtual machine handling the interrupt has completed the processing and signalled this via the virtual interface hardware 28 to the external interface hardware 26. Thus, the guest operating system will write to the EOI interrupt (within the interface registers 20) on the virtual interface 28 which will forward the EOI notification directly on to the external interface hardware 26 (the real GIC) using the physical interrupt number stored in the list registers 18.

Figure 5:
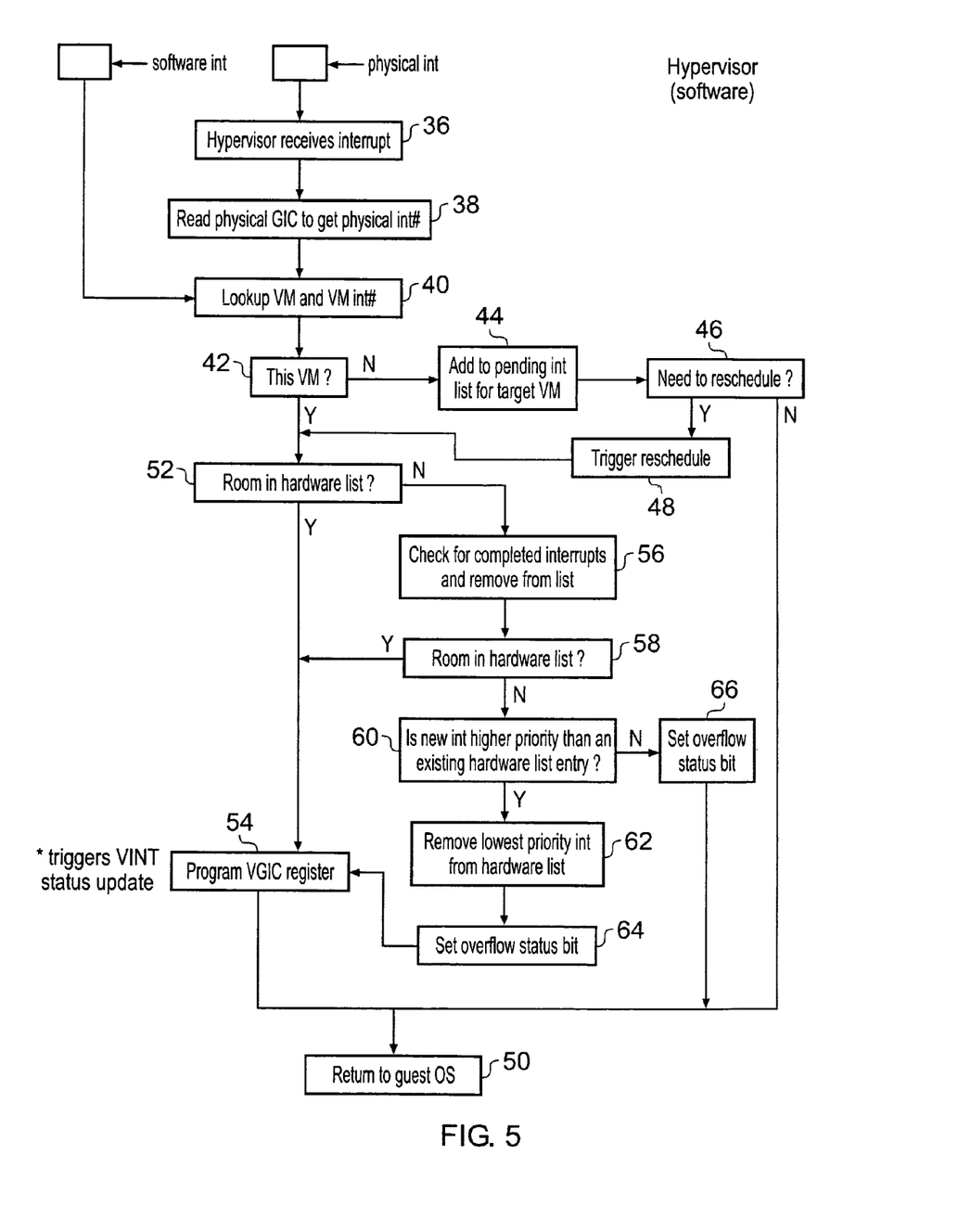
FIG. 5 is a flow diagram schematically illustrating the response of hypervisor software to receipt of an interrupt signal.

FIG. 5 is a flow diagram schematically illustrating the action of the hypervisor software when receiving a physical interrupt signal from the external interface hardware 26 or a software interrupt signal as internally generated within the hypervisor software by a virtual device, or by software running on one of the virtual machines and via the hypervisor software. At step 36 the hypervisor receives an interrupt signal and is vectored to predetermined portion of code to process that interrupt signal. At step 38 the hypervisor reads the external interface hardware 26 to determine the physical interrupt number of the physical interrupt which has arisen. At step 40 the hypervisor software looks up within the table data of FIG. 4 which virtual machine is to handle that physical interrupt signal and what is the virtual interrupt number for the physical interrupt concerned. Step 40 is the point at which a software interrupt would start processing with the hypervisor software. It will be appreciated that in FIG. 4 each illustrated physical interrupt has been pre-assigned a virtual machine which will handle that physical interrupt. It is also possible for the hypervisor software to dynamically allocate which virtual machine should be used to handle a particular physical interrupt, e.g. dependent upon the loading/status of the different virtual machines.

Returning to FIG. 5, step 42 determines whether the virtual machine to be used for handling the received interrupt is the currently active virtual machine. If this is not the case, then the interrupt is added to the pending interrupt list for the target virtual machine at step 44. This pending list for a currently non-active virtual machine is one of potentially multiple such lists managed by the hypervisor software and detailing pending interrupts for each non-active virtual machine. As a virtual machine is scheduled, then its interrupt pending list data is written into the list registers 18 and the interface registers 20 as part of the context switching operation. Step 46 determines whether there is a need to reschedule the currently active virtual machine (virtual processing apparatus) as a consequence of the newly received interrupt signal. If such rescheduling is necessary, then this is performed at step 48 with a context switch as will be described in conjunction with FIG. 12. If rescheduling is not required, then processing proceeds to step 50 where a return is made to the guest operating system. In this case the pending interrupt has been recorded by the hypervisor and will be dealt with in due course by the associated virtual machine when that virtual machine is scheduled for execution by the hypervisor software.

Step 52 determines whether the data characterising the interrupt received can be written within the list registers 18, i.e. there is sufficient room within the list registers 18. This may be done by searching for an entry flagged as empty. Alternatively, the software can separately maintain a list of which entries are empty in advance so as to avoid needing to perform a search. If there is sufficient room, then step 54 programs the list registers with data characterising the received interrupt as previously described. The writing of the data to the list registers 18 at step 54 serves to trigger an update of the virtual interrupt status associated with the various interrupts stored within the list registers 18. This update of status is performed under hardware control of the control circuitry 22 in accordance with the processing illustrated in FIG. 6.

If the determination at step 52 is that there is no room in the list registers 18 for the newly received interrupt, then processing proceeds to step 56 where the list registers 18 are checked to see if they include any completed interrupts. This completed interrupt check can be performed in accordance with the processing described below in association with FIG. 11. If a completed interrupt is identified within the list registers 18, then it is emptied from the list registers. Step 48 determines whether or not there is now room within the list registers 18 for the newly received interrupt. If room has been made available by the removal of a completed interrupt at step 56, then processing proceeds to step 54. If there is still no room within the list registers 18, then step 60 determines whether the new interrupt has a higher priority than any interrupt already present within the list registers 18. If the new interrupt has such a higher priority, then it can replace the lower priority interrupt within the list registers 18 (preferably the lowest priority interrupt) with that removed interrupt being placed into the software list held by the hypervisor software. The overflow bit is also set indicating that there are pending interrupts in addition to those in the list registers 18. These processing steps are illustrated in steps 62 and 64. Processing then proceeds to step 54.

If the determination at step 60 was that the new interrupt does not have a higher priority than the existing interrupts populating the list registers 18, then step 66 sets the overflow status bit and the newly received interrupt is added to the list of pending interrupts held within the hypervisor in software. Following steps 54 and 66 processing proceeds to step 50 where a return is made to the guest operating system.

The processing performed in FIG. 5 is in this example embodiment controlled by the hypervisor software and actioned by the hypervisor software. It will be appreciated that other arrangements whereby part of the functionality illustrated in FIG. 5 was moved into hardware would also be possible. In general the division between functions performed in hardware and functions performed in software can differ from the example embodiment described herein whilst still utilising the present technique.

Figure 6:
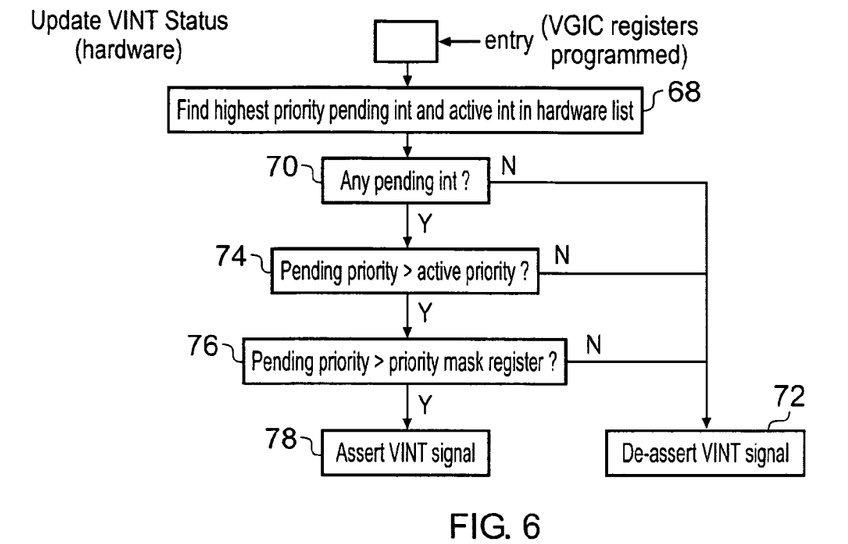
FIG. 6 is a flow diagram schematically illustrating the response of the virtual interface hardware to programming of one of the list registers.

FIG. 6 is a flow diagram illustrating a status update operation performed upon the virtual interrupts held within the list registers 18 whenever a write is made to those list registers (e.g. step 54 in FIG. 5). The processing illustrated in FIG. 6 is performed under hardware control, i.e. under control of the control circuitry 22 illustrated in FIG. 2.

At step 68 the highest priority pending interrupt and highest priority active interrupt within the register list 18 are identified. A determination at step 68 identifies if there are no pending interrupts (this could arise if all the data within the list registers 18 was written to so as to clear that data (i.e. all entries being marked as empty)). In this case, processing proceeds to step 72 where the virtual interrupt signal VINT supplied to the processor cores 30 is deasserted.

It may be that nested interrupts are being handled by the current virtual machine such that at least one interrupt is partway processed (active). If a determination at step 70 was that there are some pending interrupts, then step 74 determines whether or not the priority of the highest priority pending interrupt is greater than the priority of the highest priority active interrupt. If this is not the case, then no action is required in response to the write to the list registers 18 as the currently active interrupt is still appropriate. Accordingly, processing can proceed to step 72.

Step 76 determines whether or not the priority of the highest priority pending interrupt exceeds the priority stored in the priority mask register that forms part of the list registers 18. If the highest priority pending interrupt does exceed the priority mask register indication, then processing proceeds to step 78 where the virtual interrupt signal VINT is asserted so as to trigger the guest operating system of the associated processor to vector to one of its interrupt handlers 12, to read the virtual interface hardware 28 and to start processing the newly arrived interrupt.

A priority binary point value may also be associated with the list registers 18 (i.e. stored within a control register shown as "Status" in FIG. 2). This binary point value can define an amount by which the priority of a newly received interrupt must exceed the priority of an already active interrupt in order to pre-empt that already active interrupt. It may be the case that only if a newly received interrupt is significantly higher in priority than a currently active interrupt, will it be permitted to pre-empt that currently active interrupt rather than wait for it to finish. There is an overhead associated with switching from one interrupt to another interrupt that may not be justified by the degree to which the priority of a newly received interrupt exceeds the priority of the current interrupt.

Figure 7:
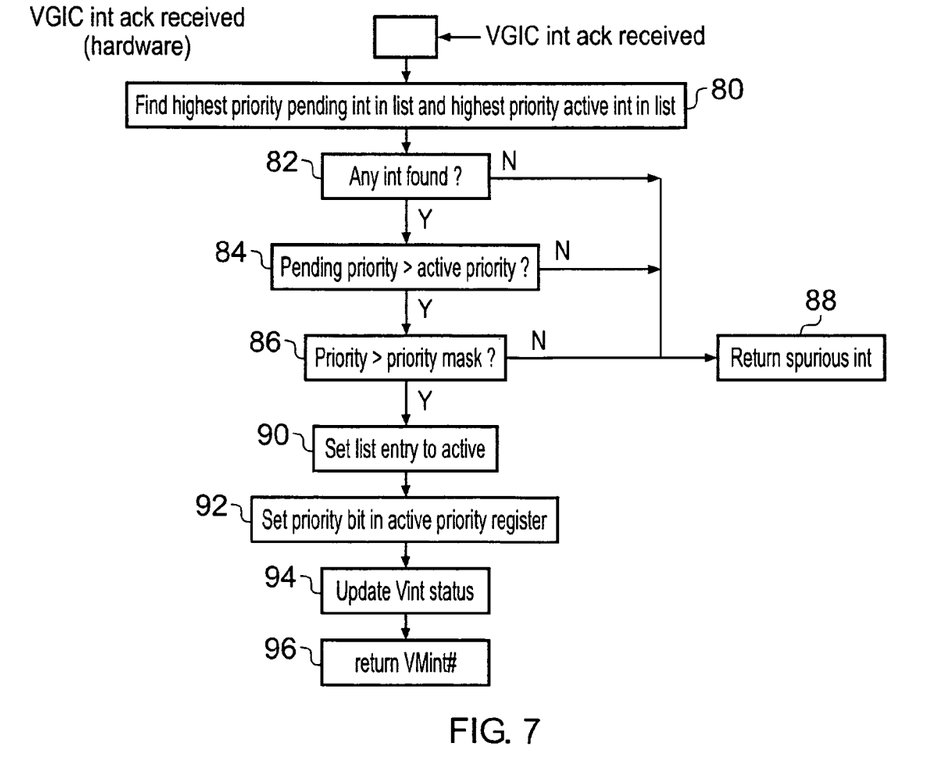
FIG. 7 is a flow diagram schematically illustrating the response of the virtual interface hardware to receipt of an interrupt acknowledge signal.

FIG. 7 illustrates the processing performed by the virtual interface hardware 16 under control of the control circuitry 22 when an interrupt acknowledge register within the interface registers 20 is read triggering generation of an interrupt acknowledge signal. When such an interrupt is received, then step 80 serves to identify the highest priority pending interrupt and the highest priority active interrupt within the list registers 18. Steps 82, 84 and 86 then identify whether or not the interrupt acknowledge and status of the system of characterising the interrupts currently being processed is self-consistent. If any of the tests in steps 82, 84 and 86 are failed then processing proceeds to step 88 where a signal indicating spurious interrupt processing is returned (this value being the result of the read from the interrupt acknowledge register). If all of the steps 82, 84 and 86 are passed, then step 90 serves to set as active the status of the interrupt held within the list registers 18 which is being acknowledged. Step 92 sets the priority bit corresponding to the priority of the now active interrupt within the priority register which forms part of the priority register as illustrated in FIG. 2. Step 94 triggers an update of the status in accordance with FIG. 6. Step 96 returns the virtual machine interrupt number (of the now active interrupt as the result of the read of the interrupt acknowledge register.

Figure 8:
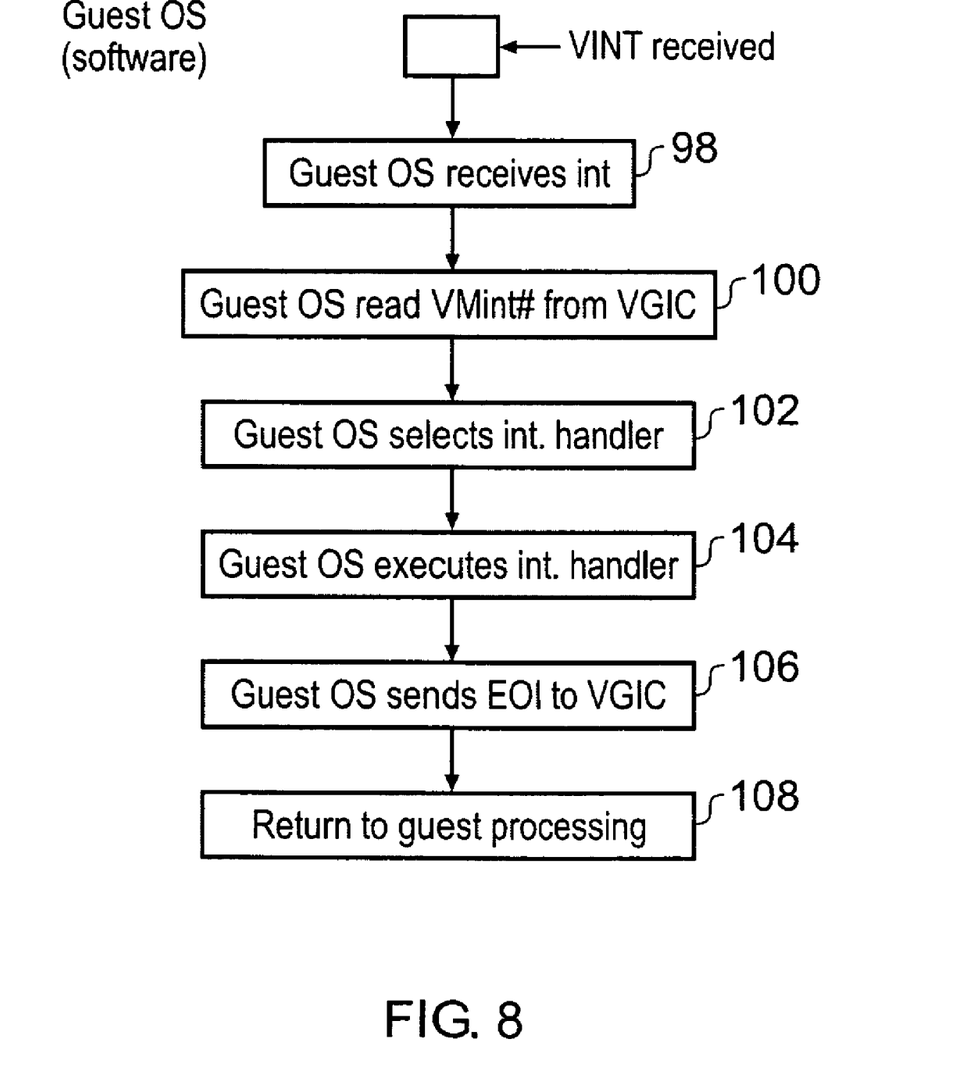
FIG. 8 is a flow diagram schematically illustrating the response of a guest operating system to receipt of a virtual interrupt signal.

FIG. 8 illustrates the processing of an interrupt by the guest operating system software. At step 98 the guest operating system receives a virtual interrupt signal (e.g. see step 78 of FIG. 6). At step 100 the guest operating system reads the virtual machine interrupt number from the interface registers 20. This virtual machine interrupt number is used by step 102 to select the appropriate handler software 12. Step 104 then executes this interrupt handler software 12. When the handler software has completed execution it sends an end-of-interrupt signal to the virtual interface hardware 16 by writing to the end-of-interrupt register within the interface registers 20 at step 106. Step 108 represents the guest operating system returning to its normal flow of processing, such as executing one of the application programs 14 illustrated in FIG. 1.

Figure 9:
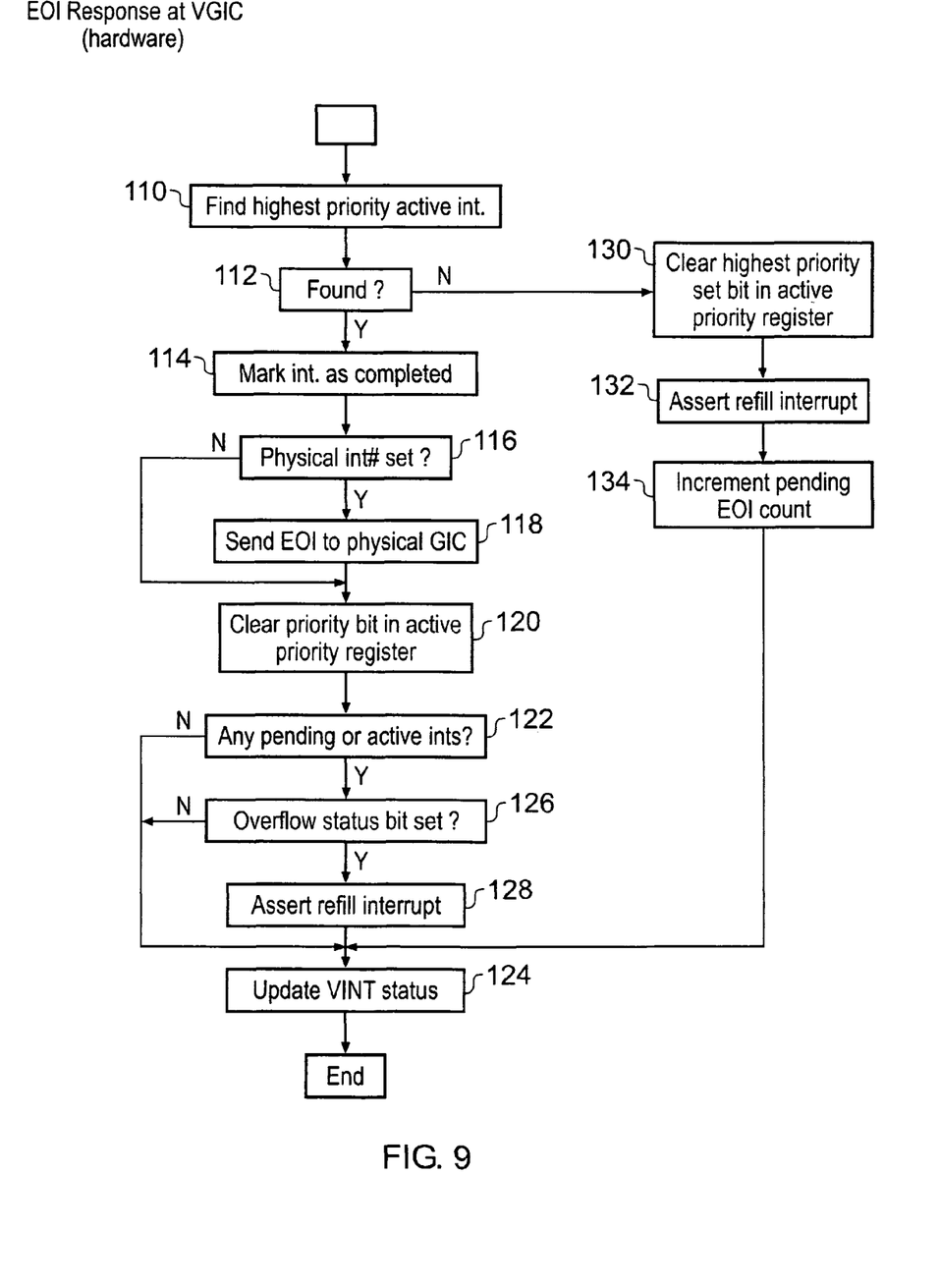
FIG. 9 is a flow diagram schematically illustrating the response of the virtual interface hardware to receipt of an end-of-interrupt signal.

FIG. 9 illustrates the response of the virtual interface hardware 16 to an end-of-interrupt event being notified to the interface registers 20 in accordance with step 106 of FIG. 8. Step 110 serves to find the highest priority active interrupt within the list registers 18. If this interrupt is found as determined at step 112, then step 114 marks this interrupt as completed. If a physical interrupt number is set for the now completed interrupt, then this is determined at step 116 (a physical interrupt being set distinguishes the now completed interrupt from one which was software generated and/or identifies the physical interrupt as one requiring end-of-interrupt acknowledge). If a physical interrupt number was identified at step 116, then step 118 sends an end-of-interrupt signal to the external interrupt interface 26. If a physical interrupt number is not set, then step 118 is bypassed.

Step 120 clears the priority bit for the now completed interrupt within the priority register. Step 122 determines whether there are any pending or active interrupts within the list registers 18. If there are no such pending or active interrupts, then processing proceeds to step 124 where a status update operation in accordance with FIG. 6 is performed. If there are pending or active interrupts within the list registers 18, then processing proceeds to step 126 where a determination is made as to whether or not the overflow status bit is set, indicating that the hypervisor software has details concerning other pending interrupts which have not yet been written into the list registers 18. If an overflow bit is not set, then processing again proceeds to step 124. If the overflow status bit is set then processing proceeds to step 128 where a refill interrupt is asserted before processing proceeds to step 124. The hypervisor software responds to a refill interrupt as discussed in relation to FIG. 10.

If the determination at step 112 was that no active interrupt is currently present within the list registers 18, then step 130 clears the highest priority bit which is set within the priority register. Step 132 then asserts the refill interrupt to the hypervisor software and step 134 increments a stored count of pending end-of-interrupt signals which have been received, but which have not been processed by the marking of a corresponding interrupt as completed.

The processing illustrated in FIG. 9 is performed under hardware control by the virtual interface hardware 16 controlled by the control circuitry 22.

Figure 10:
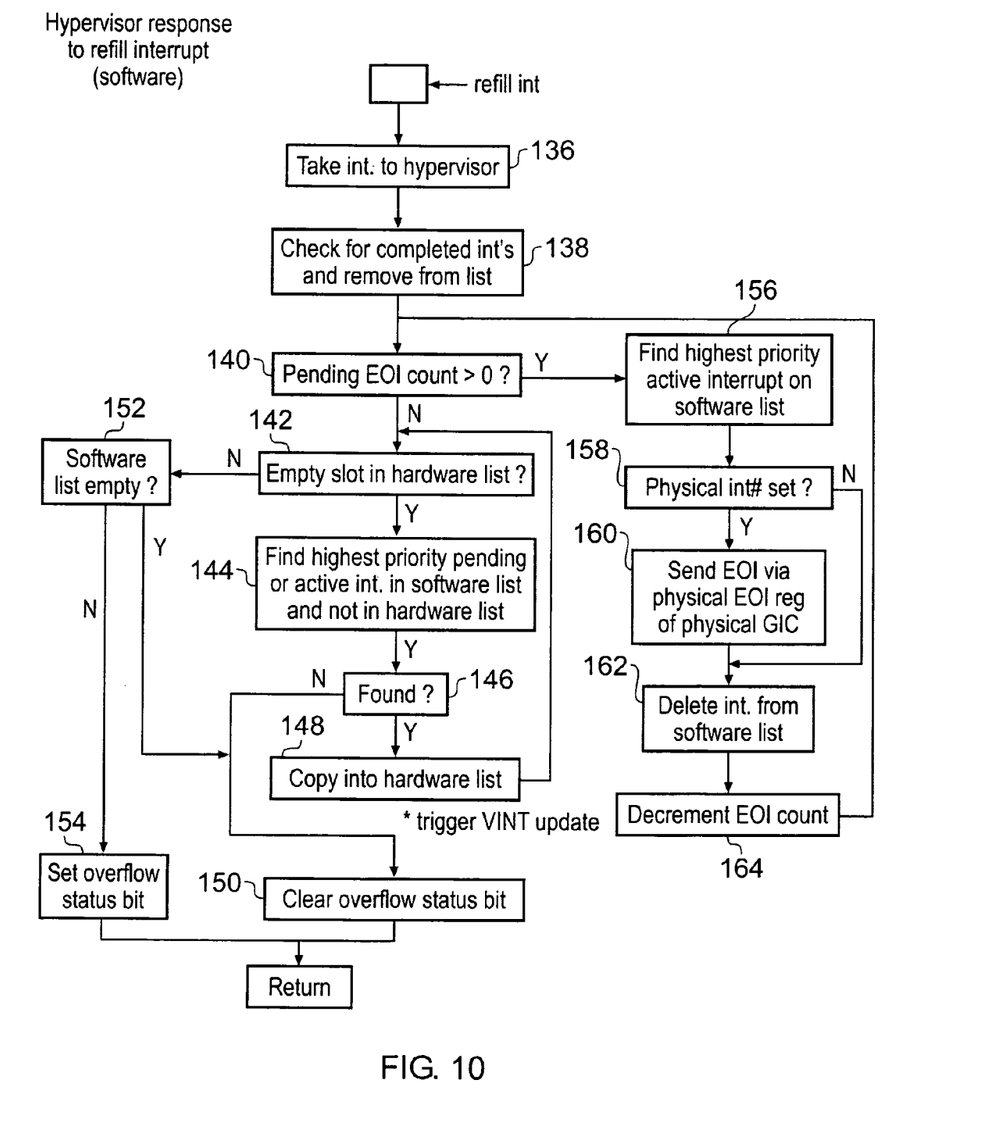
FIG. 10 is a flow diagram schematically illustrating the response of the hypervisor software to a refill interrupt.

FIG. 10 illustrates the response of the hypervisor software to a refill interrupt. At step 136 the refill interrupt triggers a vector to a predetermined portion of the hypervisor software. Step 138 then performs a check for completed interrupts within the list registers 18 and any completed interrupts are removed from the list as will be described in connection with FIG. 11.

Step 140 determines whether the pending end-of-interrupt count (see step 134 of FIG. 9) exceeds zero. If the pending end-of-interrupt count does not exceed zero, then processing proceeds to step 142 where a determination is made as to whether or not there are any empty slots within the list registers 18. If there are such empty slots, then step 144 finds the highest priority pending or active interrupt in the list maintained in software by the hypervisor with this highest priority pending or active interrupt not already being present within the list registers 18. It is possible in some embodiments that interrupts are noted within the software list of the hypervisor as well as being simultaneously noted within the list registers 18. In the current example embodiment, interrupts are listed within one of the software list maintained by the hypervisor or the list registers 18.

If step 146 indicates that such a highest priority interrupt has been identified at step 144, then step 148 serves to copy this entry into the list registers 18. This writing to the list registers 18 will trigger a status update in accordance with FIG. 6. Processing at this time returns to step 142 to determine whether or not there are any further empty slots within the hardware list.

If step 146 indicated that no pending or active interrupts are held within the hypervisor maintained software list, then processing proceeds to step 150 where the overflow status bit is cleared before a return is made form the refill interrupt.

If the determination at step 142 was that there are no empty slots within the list registers 18, then step 152 determines whether or not the software list maintained by the hypervisor is empty. If this list is empty, then step 150 clears the overflow status bit. If the software maintained list is not empty, then step 154 sets the overflow status bit (it may already be set).

If the determination at step 140 is that the pending end-of-interrupt count is greater than zero, then processing proceeds to step 156 where the highest priority active interrupt on the software maintained list is identified. Step 158 then determines whether or not a physical interrupt number is set for that highest priority active interrupt on the software list. If such a physical interrupt number is set, then this indicates that an end-of-interrupt signal should be sent via the external interrupt interface 26 at step 160. If no physical interrupt number is set, then step 160 can be bypassed. Step 162 deletes the interrupt identified from the software maintained list and step 164 decrements the end-of-interrupt count before returning processing to step 140.

Figure 11:
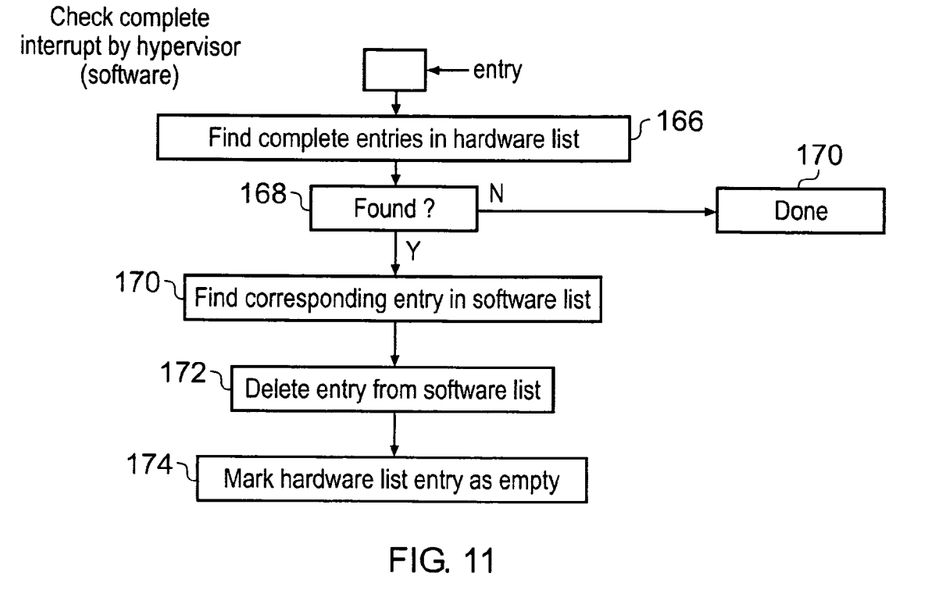
FIG. 11 is a flow diagram schematically illustrating processing performed by the hypervisor to check for completed interrupts within the list registers.

FIG. 11 illustrates the processing performed by the hypervisor software to perform a check for complete interrupt operation as previously discussed. Step 166 finds any entries within the hardware list 18 which are marked as complete. If step 168 determines that no such entries are found, then processing proceeds to step 170 where this check is terminated. If such complete entries are found, then step 170 finds any corresponding entry within the software maintained list. Steps 172 and 174 then delete the completed entry from the software list and from the relevant list register 18 as appropriate. It will be appreciated that in this FIG. 11 example an interrupt is maintained in both the software list and the list registers 18. If an interrupt is maintained in only one of these places, then an entry completed in the hardware list can be deleted from the hardware list (e.g. the entry marked as empty) and there will be no need to delete it from the software list as no copy will exist in the software list. The performance of these maintenance operations presents an opportunity for the Hypervisor to perform any tasks contingent on the completion of that interrupt (for software generated interrupts this might involve a callback to indicate that processing is complete). It also presents an opportunity to add the now-vacant slots to the empty slots list discussed above in connection with FIG. 5.

Figure 12:
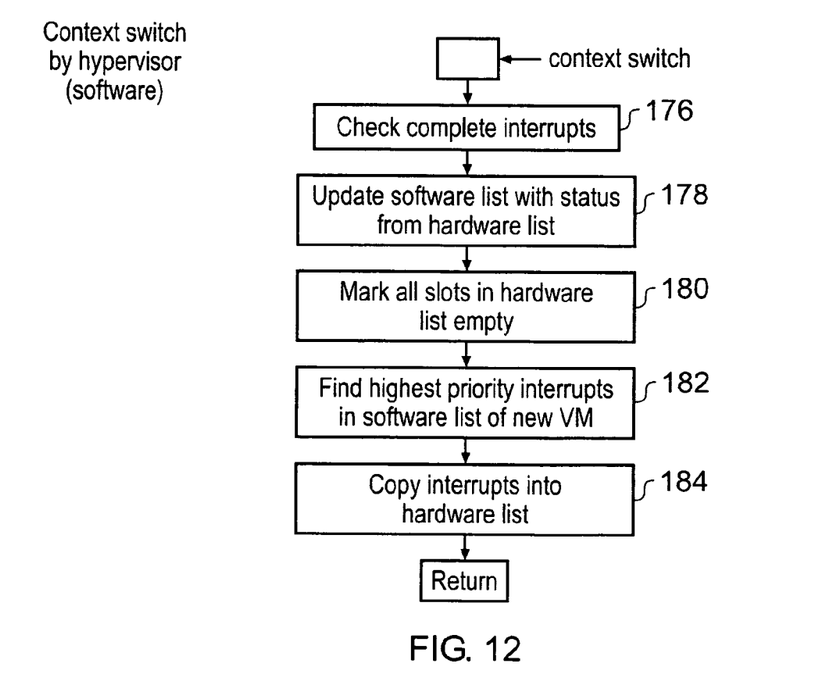
FIG. 12 is a flow diagram schematically illustrating some of the operations performed by the hypervisor upon a context switch (e.g. a virtual machine switch).

FIG. 12 illustrates processing performed on a context switch by the hypervisor, i.e. upon a change in virtual machine. Step 176 checks for completed interrupts. This check for completed interrupts can be in accordance with the example of FIG. 11. Step 178 then updates the software maintained list of pending interrupts managed by the hypervisor with the data from the hardware list (list registers 18). This software list is specific to the virtual machine out of which a switch is being made and can be reinstated when a switch is made back into that virtual machine. Step 180 marks all of the list registers 18 as empty. Step 182 finds the highest priority interrupts in the software list of the new virtual machine being switched to and step 184 writes these identified highest priority interrupts into the list registers 18. It will be appreciated that considerable further additional processing will be performed when switching a virtual machine switch and that the steps illustrated in FIG. 12 correspond to the actions needed to switch the context of the virtual interrupt hardware and associated software lists.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing interrupt signals using an apparatus for processing data providing virtualisation support for one or more virtual processing apparatuses, said method comprising the steps of:

writing data characterising an interrupt signal to at least one of one or more virtual interfaces to respective virtual processing apparatuses in response to said interrupt signal received by said apparatus for processing data, said one or more virtual interfaces is provided in hardware separately from a memory of said apparatus for processing data and respectively including one or more list registers storing a list of uncompleted interrupts for an associated virtual processing apparatus;

generating a virtual interrupt signal to trigger interrupt processing corresponding to interrupt processing by said associated virtual processing apparatus in response to said list of uncompleted interrupts within said list registers of said at least one virtual interface, and providing data characterising said virtual interrupt signal for reading from one or more interface registers included within said at least one virtual interface;

using a first control program, executing as though upon said associated virtual processing apparatus and in response to said virtual interrupt signal, to read said data characterising said interrupt signal from said one or more interface registers; and performing interrupt processing, in response to said data characterising said interrupt signal read from said one or more interface registers, under control of said first control program and corresponding to interrupt processing by said associated virtual processing apparatus.

2. A method as claimed in claim 1, wherein said writing data characterising said interrupt signal to said at least one of one or more virtual interfaces is performed using a second control program executed by said apparatus for processing data.

3. A method as claimed in claim 1, further comprising the step of writing data indicative of completion of said interrupt processing to said one or more interface registers under control of said first control program.

4. A method as claimed in claim 3, further comprising the step of reading data indicative of completion of said interrupt processing from said one or more interface registers using said second control program to note said interrupt processing by said associated virtual processing apparatus as completed.

5. A method as claimed in claim 1, wherein a plurality of virtual processing apparatuses share a virtual interface provided in hardware and said second control program controls which virtual processing apparatus is currently using said virtual interface.

6. A method as claimed in claim 1, wherein said apparatus for processing data is a multiprocessing apparatus comprising a plurality of processors, each processor having a virtual interface provided in hardware and controlled in dependence upon which virtual processing apparatus is being supported by said processor.

7. A method as claimed in claim 1, wherein said second control program maintains data characterising uncompleted interrupts in respect of each of said one or more virtual processing apparatuses.

8. A method as claimed in claim 5, wherein said second control program manages swapping in to and out of said one or more list registers data characterising uncompleted interrupts so as to correspond to a currently active virtual processing apparatus.

9. A method as claimed in claim 1, wherein said uncompleted interrupts comprise one or more of:

a pending interrupt that has arisen due to said interrupt signal received by said apparatus for processing data and has not yet been notified to said first control program; and an active interrupt which has been notified to said first control program and is still subject to said interrupt processing under control of said first control program.

10. A method as claimed in any claim 1, comprising:

receiving said interrupt signal at one of a plurality of interrupt signal inputs of an external interrupt controller;

in response to said interrupt signal, providing with said external interrupt controller initial data characterising said interrupt signal to be read from one of one or more external interface registers of said hardware interrupt controller; and reading said initial data characterising said interrupt signal from said external interface registers with said second control program as part of said processing to respond to said interrupt signal.

11. A method as claimed in claim 10, wherein said reading said initial data characterising said interrupt signal from said external interface registers with said second control program serves to acknowledge receipt of said interrupt signal.

12. A method as claimed in claim 10, wherein said external interrupt controller processes without prioritisation interrupt signals received at a plurality of interrupt signal inputs.

13. A method as claimed in claim 12, wherein said external interrupt controller is responsive to setting of a configuration flag to switch to processing with prioritisation interrupt signals received at a plurality of interrupt signal inputs.

14. A method as claimed in claim 2, wherein said interrupt signal received by said apparatus for processing data has an interrupt number, said virtual interrupt signal has an virtual interrupt number and said second control program serves to map between said interrupt number and said virtual interrupt number.

15. A method as claimed in claim 2, wherein said second control program selects which of said plurality of virtual processing apparatuses is to serve to perform said interrupt processing.

16. A method as claimed in claim 2, wherein said second control program is also responsive to a software generated interrupt signal in place of said interrupt signal received by said apparatus for processing data.

17. A method as claimed in claim 16, wherein said software generated interrupt signal is generated within said second control program.

18. A method as claimed in claim 16, wherein said software generated interrupt signal is generated by one of said virtual processing apparatuses.

19. A method as claimed in claim 2, wherein said second control program buffers data characterising uncompleted interrupts if said one or more list registers overflow.

20. A method as claimed in claim 19, wherein said second control program refills said one or more list registers with said data characterising uncompleted interrupts and buffered by said second program as free space within said one or more list registers become available.

21. A method as claimed in claim 20, wherein said one or more virtual interfaces provided in hardware generate a refill interrupt to trigger said refilling by said second control program when said interrupt processing under control of said first control program has completed and said second control program is buffering data characterising uncompleted interrupts.

22. A method as claimed in claim 21, wherein generation of said refill interrupt is controlled by an overflow flag, said overflow flag being set by said second control program when said second control program is buffering data characterising uncompleted interrupts.

23. A method as claimed in claim 21, wherein said one or more virtual interfaces provided in hardware include a counter register arranged to maintain a count of instances of interrupt processing being completed before said second control program can respond to said refill interrupt.

24. A method as claimed in claim 1, wherein said at least one virtual interface includes a priority register storing priority data indicative of priority levels associated with any interrupt processing currently being performed as though upon said associated virtual data processing apparatus.

25. A method as claimed in claim 1, wherein said generating of said virtual interrupt signal and said writing of said writing of said data characterising said virtual interrupt signal is performed under hardware control by said virtual interface.

26. A method as claimed in claim 1, wherein one or more list registers store data indicative of one or more of:
a physical interrupt number;
a virtual interrupt number;
a requesting processing apparatus within a multiprocessing apparatus in respect of software interrupts;
a priority value;
a valid flag; and
a flag differentiating a type of interrupt signal received by said apparatus for processing data.

27. A method as claimed in claim 9, wherein one or more list registers store data indicative of whether a corresponding uncompleted interrupt is a pending interrupt or an active interrupt.

28. A method as claimed in claim 1, wherein one or more interface registers store data indicative of one or more of:
a physical interrupt number; and
a requesting processing apparatus within a multiprocessing apparatus in respect of software interrupts.

29. A method as claimed in claim 1, wherein one or more control registers associated with said virtual interface store data indicative of one or more of:
a list of active priorities associated with nested interrupts;
a count of instances of interrupt processing being completed without a corresponding update in data tracking said interrupt processing;
a flag indicative of uncompleted interrupts being buffered;
a priority mask value;
a priority binary point value; and
a flag enabling said virtual interface.

30. A method as claimed in claim 1, wherein said second control program is a hypervisor control program.

31. A method as claimed in claim 1, wherein said first control program is a guest operating system program.

32. A method as claimed in claim 24, wherein said interrupt signal received by said apparatus for processing data has an associated priority value and said step of generating a virtual interrupt signal in response to receipt of said interrupt signal is dependent upon a comparison of said associated priority value and said priority data stored in said priority register such that interrupt processing currently being performed will not be interrupted as a consequence of a lower priority interrupt signal received by said apparatus for processing data.

33. A method as claimed in claim 32, wherein said comparison is also dependent upon one or more of said priority mask value and said priority binary point value.

34. A method as claimed in claim 26, wherein in response to completion of said interrupt processing under control of said first control program mapping a virtual interrupt number used by said virtual data processing apparatus to a physical interrupt number associated with said interrupt signal received by said apparatus for processing data and triggering signalling of said completion to a source of said interrupt signal using said physical interrupt number.

35. Apparatus for processing data providing virtualisation support for one or more virtual processing apparatuses, said apparatus comprising:
external interrupt interface circuitry configured to write, in response to an interrupt signal received by said apparatus, data characterising said interrupt signal to one or more external interface registers so as to communicate with a second control program; and
virtual interrupt interface circuitry configured to provide a virtual interface to respective virtual processing apparatuses, said virtual interface including one or more list registers storing a list of uncompleted interrupts for an associated virtual processing apparatus, said one or more list registers at least writable by said second control program said virtual interrupt interface circuitry is provided in hardware separately from a memory of said apparatus for processing data; wherein
in response to said list of uncompleted interrupts within said list registers, said virtual interrupt interface circuitry is configured to generate a virtual interrupt signal to trigger interrupt processing corresponding to interrupt processing by said associated virtual processing apparatus and under control of a first control program; and write data characterising said virtual interrupt signal to one or more virtual interface registers included within said virtual interrupt interface circuitry for said virtual interface.

36. Apparatus as claimed in claim 35, wherein said one or more virtual interface registers include a field allocated to writing under control of said first control program of data indicative of completion of said interrupt processing.

37. Apparatus as claimed in claim 35, said one or more virtual interface registers include a field allocated to reading by said second control program of data indicative of completion of said interrupt processing to note said interrupt processing by said associated virtual processing apparatus as completed.

38. Apparatus as claimed in claim 35, wherein a plurality of virtual processing apparatuses share said virtual interrupt interface circuitry and said second control program controls which virtual processing apparatus is currently using said virtual interrupt interface circuitry.

39. Apparatus as claimed in any claim 35, wherein said apparatus for processing data is a multiprocessing apparatus comprising a plurality of processors, each processor having a virtual interface provided in hardware and controlled in dependence upon which virtual processing apparatus is being supported by said processor.

40. Apparatus as claimed in any claim 35, wherein said reading of said data characterising said interrupt signal from said external interface registers with said second control program serves to trigger said external interrupt interface circuitry to acknowledge receipt of said interrupt signal.

41. Apparatus as claimed in claim 35, wherein said external interrupt interface circuitry processes without prioritisation interrupt signals received at a plurality of interrupt signal inputs.

42. Apparatus as claimed in claim 41, wherein said external interrupt interface circuitry is responsive to setting of a configuration flag to switch to processing with prioritisation interrupt signals received at a plurality of interrupt signal inputs.

43. Apparatus as claimed in claim 35, wherein said second control program buffers data characterising uncompleted interrupts if said one or more list registers overflow.

44. Apparatus as claimed in claim 43, wherein said second control program refills said one or more list registers with said data characterising uncompleted interrupts and buffered by said second program as free space within said one or more list registers become available.

45. Apparatus as claimed in claim 44, wherein said virtual interrupt interface circuitry generates a refill interrupt to trigger said refilling by said second control program when said interrupt processing under control of said first control program has completed and said second control program is buffering data characterising uncompleted interrupts.

46. Apparatus as claimed in claim 45, wherein generation of said refill interrupt is controlled by an overflow flag, said overflow flag being set by said second control program when said second control program is buffering data characterising uncompleted interrupts.

47. Apparatus as claimed in claim 45, wherein said virtual interrupt interface circuitry includes a counter register arranged to maintain a count of instances of interrupt processing being completed before said second control program can respond to said refill interrupt.

48. Apparatus as claimed in claim 35, wherein said virtual interrupt interface circuitry includes a priority register storing priority data indicative of priority levels associated with any interrupt processing currently being performed as though upon an associated virtual data processing apparatus.

49. Apparatus as claimed in claim 35, wherein one or more list registers store data indicative of one or more of:
  a physical interrupt number;
  a virtual interrupt number;
  a requesting processing apparatus within a multiprocessing apparatus in respect of software interrupts;
  a priority value;
  a valid flag; and
  a flag differentiating a type of interrupt signal received by said apparatus for processing data.

50. Apparatus as claimed in claim 35, wherein one or more list registers store data indicative of whether a corresponding uncompleted interrupt is:
  a pending interrupt that has arisen due to said interrupt signal received by said apparatus for processing data and has not yet been notified to said first control program; and
  an active interrupt which has been notified to said first control program and is still subject to said interrupt processing under control of said first control program.

51. Apparatus as claimed in claim 35, wherein one or more virtual interface registers store data indicative of one or more of:
  a physical interrupt number; and
  a requesting processing apparatus within a multiprocessing apparatus in respect of software interrupts.

52. Apparatus as claimed in claim 35, wherein one or more control registers associated with said virtual interrupt interface circuitry store data indicative of one or more of:
  a list of active priorities associated with nested interrupts;
  a count of instances of interrupt processing being completed without a corresponding update in data tracking said interrupt processing and accessible to said second control program being performed;
  a flag indicative of uncompleted interrupts being buffered by said second control program;
  a priority mask value;
  a priority binary point value; and
  a flag enabling said virtual interface.

53. Apparatus as claimed in claim 35, wherein said second control program is a hypervisor control program.

54. Apparatus as claimed in claim 35, wherein said first control program is a guest operating system program.

55. Apparatus as claimed in claim 48, wherein said interrupt signal received by said apparatus for processing data has an associated priority value and said virtual interrupt interface circuitry generate a virtual interrupt signal in response to receipt of said interrupt signal in dependent upon a comparison of said associated priority value and said priority data stored in said priority register such that interrupt processing currently being performed will not be interrupted as a consequence of a lower priority interrupt signal received by said apparatus for processing data.

56. Apparatus as claimed in claim 55, wherein said comparison is also dependent upon one or more of said priority mask value and said priority binary point value.

57. Apparatus as claimed in claim 49, wherein in response to completion of said interrupt processing under control of said first control program mapping a virtual interrupt number used by said virtual data processing apparatus to a physical interrupt number associated with said interrupt signal received by said apparatus for processing data and triggering signalling of said completion to a source of said interrupt signal using said physical interrupt number.

58. Apparatus for processing data providing virtualisation support for one or more virtual processing apparatuses, said apparatus comprising:
  external interrupt interface means for writing, in response to an interrupt signal received by said apparatus for processing data, data-characterizing said interrupt signal to one or more external interface register means for storing the data so as to communicate with a second control program; and
  virtual interrupt interface means for providing a virtual interface to respective virtual processing apparatuses, said virtual interface including one or more list register means for storing a list of uncompleted interrupts for an associated virtual processing apparatus, said one or more list register means is at least writable by said second control program, said virtual interrupt interface means is provided in hardware separately from a memory of said apparatus for processing data; wherein in response to said list of uncompleted interrupts stored within said list register means, said virtual interrupt interface means generates a virtual interrupt signal for triggering interrupt processing corresponding to interrupt processing by said associated virtual processing apparatus and under control of said first control program, and write data characterising said virtual interrupt signal to one or more virtual interface register means for storing the data included within said virtual interrupt interface means for said virtual interface.

* * * * *